No. 635,127. Patented Oct. 17, 1899.
C. CUMMINGS.
CONTROLLING MECHANISM FOR FLUIDS OR GASES UNDER PRESSURE.
(Application filed Sept. 29, 1898.)
(No Model.)
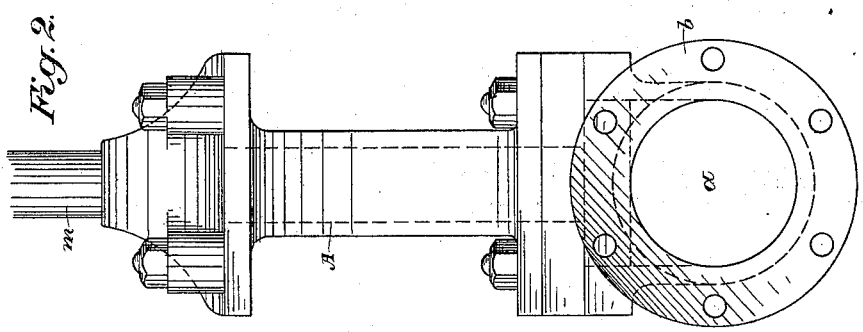
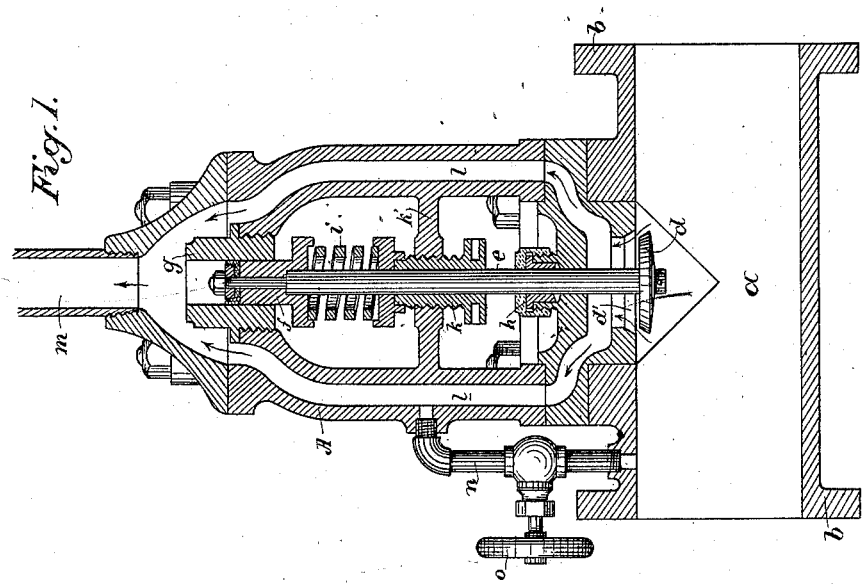
Witnesses,
Inventor
Charles Cummings
By Dewey Strong & Co.
Attys

UNITED STATES PATENT OFFICE.

CHARLES CUMMINGS, OF OAKLAND, CALIFORNIA, ASSIGNOR TO THE PNEUMATIC POWER COMPANY, OF SAN FRANCISCO, CALIFORNIA.

CONTROLLING MECHANISM FOR FLUIDS OR GASES UNDER PRESSURE.

SPECIFICATION forming part of Letters Patent No. 635,127, dated October 17, 1899.

Application filed September 29, 1898. Serial No. 692,155. (No model.)

*To all whom it may concern:*

Be it known that I, CHARLES CUMMINGS, a citizen of the United States, residing in Oakland, county of Alameda, State of California, have invented an Improvement in Controlling Mechanism for Fluids or Gases Under Pressure; and I hereby declare the following to be a full, clear, and exact description of the same.

My invention relates to the improvement of valves used in pipes conveying fluids or gases under pressure.

In operating machines by fluids or gases under pressure a main pipe or pipes extend from the source of power, which may be of any suitable character, to any required distance. Combined with the main pipes small ones are used to connect with the motors to be actuated and any number of motors may thus be attached to the main pipes and operated up to the limit of power furnished by the source. If in any plant installed for the purpose of transmitting power in this manner, consisting of a system of pipes and motors, as above described, one or more of the small pipes connecting the main pipe with the motor should by accident or otherwise become fractured, an escape of the medium transmitting the power would immediately take place, and if the connection between the fractured pipe and the main pipe is not speedily closed not only the motor connected with the broken pipe, but the whole series, would soon become inoperative.

This device may be used to advantage in connection with that system for the transmission of power by means of compressed air which is described and illustrated in Letters Patent of the United States No. 456,941, granted to me August 4, 1898. In that former patent an apparatus is disclosed for transmitting power by means of compressed air or other gas or fluid circulating in a closed system at two unequal pressures. In this system the small pipe leading from the main high-pressure pipe to the motor is to be provided with my invention, the object of which is to provide a valve or device which will immediately and automatically close the opening in the main pipe in case of accidents of the kind above mentioned. I attain this object by means of mechanism which will be more fully explained by reference to the accompanying drawings, in which—

Figure 1 is a vertical section through my device. Fig. 2 is an end elevation of the same.

$a$ is a pipe-section having the same diameter as that of the main conducting-pipe and provided with flanges $b$ and bolt-holes therethrough coincident with corresponding bolt-holes in the similar adjacent flanges of the main pipe, so that this section may be fixed in the main pipe at any desired point. In connection with this section is my controlling mechanism, which is interposed between this section and the small pipe $m$, which connects the main pipe with the motor. It consists of a housing A, secured to the section $a$, with an opening from said section and ports or passages extending on each side of the housing into a head with which the pipe $m$ connects. The sides of the housing are open to allow access to the operative parts.

$d$ is a valve mounted upon a valve-stem $e$ and adapted to close against a seat $d'$, and thus control the opening leading from the section $a$ into the passages $l$, through which the medium under pressure passes from the main to the small pipe $m$ and the motor. The upper end of the stem $e$ carries the piston $f$, which is adapted to reciprocate within the small cylinder $g$. The piston $f$ is made tight by means of a cup-leather or any other usual or suitable means for making a tight joint.

$h$ is a stuffing-box through which the stem $e$ passes in the lower part of the housing.

$i$ is a spring the upper end of which presses against the piston $f$ and the lower end against an adjusting-screw $k$, which is turnable in the screw-threaded nut or bracket $k'$, so that by turning the screw $k$ in one direction or the other the tension of the spring $i$ may be increased or diminished at will. The head of the screw is exposed below the bracket and is formed to receive a turning pin or wrench, by which its adjustment is effected. The tension of this spring pressing against the piston $f$, and thus acting through the valve-stem $e$, will normally close the valve $d$ upon its seat when no other force is acting to keep it open.

$n$ is a small pipe connecting the section $a$ and the main pipe with the ports or passages *l* and through these with the small pipe *m*, which leads to the motor.

*o* is a hand-valve by which the passage in the pipe *n* is opened or closed at will. By opening this valve the fluid under pressure in the main pipe passes through the port *l* and pipe *m* to the motor, and the pressure in the pipes is thus balanced, after which the valve *o* is closed.

Other forms and construction of details which would produce an equivalent action may be employed as different conditions appear which require changes of construction without departing from the principle here involved and which is illustrated by the present construction.

The operation of the device will then be as follows: The main pipe or pipes being charged with a fluid or gas under pressure, the valve *d* being opened as shown, the fluid or gas passes through the ports *l* from the main pipe to the pipe *m*, through which it reaches the motor to be actuated. Under these conditions the valve *d* will remain open by reason of the excess of pressure upon the piston *f* in the direction to keep the valve open. This excess of pressure can be made greater or less by varying the area of the piston *f* and also by varying the strength of the spring *i*. The proper proportions of the piston and the spring depend in any particular case upon the degree of pressure carried in the main pipe to operate the system. The spring *i* by adjustment admits of a considerable range of pressure in the main pipe without changing the area of the piston *f*. When thus in operation, the pressure in the main pipe and that in the small pipe *m*, leading to the motor, is nearly, if not quite, equal. If through any cause the pipe *m* should be injured and so allow an escape of the fluid or gas from it sufficient to make the necessary difference of pressure between that in the main pipe and that above the valve *d* and piston *f*, the valve *d* will immediately close and prevent further loss.

The difference of pressure required to work the valve *d* can be varied, as previously stated, by means of the spring *i* and the adjusting-screw *k*.

A gradual subsidence of the pressure in the system of pipes charged with the fluid or gas under pressure tends to weaken the force which keeps the valve open; but if the pressure in the pipe should be reduced to that of the atmosphere the valve *d* would still remain open, provided the upward force of the spring *i* is less than the friction of the piston *f* added to that of the stem *e*, passing through the stuffing-box *h*. Should the valve *d* close through a loss of pressure in the pipe *m* from any cause, accident or otherwise, it can be again opened by opening the valve *o* in the pipe *m*, thus again admitting the fluid from the main pipe into the apparatus and the connecting-pipe *m* until the pressure on the piston *f* has been increased sufficiently to open the valve *d*, after which the hand-valve *o* must be again closed.

In the system disclosed in my former patent heretofore alluded to the protection from the loss of air in case of accident to the small pipe which leads from the motor to the main low-pressure pipe may be provided by means of an ordinary check-valve placed in the small low-pressure pipe near the main, which will effectually close the opening in the main pipe in case of accident to the small low-pressure pipe anywhere between the motor and the check-valve.

Where the main pipe or pipes of a system for transmitting power of the character above described are placed in a comparatively safe position, as in a ship of war, and only the small or leading pipes are exposed to accidents, this invention affords a means for automatically preventing the stoppage of all the motors when an accident displaces one or more of a series which are actuated from a common source of power.

Having thus described my invention, what I claim as new, and desire to secure by Letters Patent, is—

1. In pipes conveying gases or fluids under pressure, passages from main to supplemental pipes, valves by which said passages are controlled, a guided valve-stem having a piston fixed to its opposite end movable within a cylinder, one end of which communicates with the supplemental conveying-pipe, and the other with the open air whereby the controlling-valve remains open while the fluid is passing and is automatically closed by reduction of pressure in the supplemental pipe.

2. In an apparatus for transmitting compressed air or other gas or fluid, an automatically-operating valve interposed between the main and supplemental conducting-pipes, a piston mounted upon the valve-stem and movable in a cylinder, one end of which is opened to pressure from the passage between the two pipes and the other to atmospheric pressure.

3. In an apparatus for transmitting compressed air or other gas or fluid under pressure, the main pipe through which the fluid is conveyed, a supplemental pipe transmitting from the main pipe to the meter, a balanced valve of the character described interposed between the main and supplemental pipes and adapted to close communication between the two when the pressure in the supplemental pipe is reduced, and a spring-pressed piston one end of which is opened to pressure from the supplemental pipe and the other to atmospheric pressure.

4. In an apparatus for transmitting power by means of compressed air or other gas or fluid, a main conducting-pipe, a supplemental pipe transmitting the fluid from the main pipe to the motor, a valve closable against the seat between the main and supplemental pipes, a valve-stem to which said valve is connected, a piston fixed to the valve-stem and a cylinder within which it reciprocates, said cylinder having one end open to the pressure in the supplemental pipe, and a spring pressing against the opposite end of the piston and adapted to close the valve when the pressure in the supplemental pipe is reduced.

5. In an apparatus for transmitting power by means of compressed air or other gas or fluid, main and supplemental conducting-pipes, a valve mounted upon a valve-stem and closable against a seat between the main and supplemental pipes, a piston fixed to the valve-stem, a cylinder in which said piston fits and reciprocates having one end open to pressure from the supplemental conducting-pipe, a spring, one end of which abuts against the opposite end of the piston, said spring adapted to close the valve when the pressure in the supplemental pipe is reduced, a screw against which the opposite end of the spring abuts and a bracket or nut within which the screw is movable to regulate the tension of the spring.

6. An apparatus for transmitting power by means of compressed air or other gas or fluid circulating in a system, main and supplemental conducting-pipes, a valve fixed to a valve-stem and closable against a seat between the main and supplemental pipes, ports connecting the opening of the valve-seat with the supplemental pipe, a housing having a stuffing-box through which the valve-stem passes, a cylinder fixed in line therewith at the opposite end, a piston fitting and movable within said cylinder and open to pressure from the passage through which the fluid passes to the supplemental pipe, a second pipe connecting the main pipe with said passage and having a valve through which the fluid may be independently transmitted from the main to the supplemental passage, a spring surrounding the valve-stem, and adapted to close the main valve when the pressure in the supplemental pipe is reduced, one end of said spring abutting against the end of the piston and an adjustable screw against which the opposite end abuts and by which the tension of the spring may be varied.

In witness whereof I have hereunto set my hand.

CHARLES CUMMINGS.

Witnesses:
S. H. NOURSE,
JESSIE C. BRODIE.